PRESSURE OPERATED PAPER TAPE READER

Original Filed Dec. 29, 1964

INVENTORS
ARNOLD SCHONFELD
MARVIN JACOBY
BY Thomas P. Murphy
AGENT

United States Patent Office 3,485,970
Patented Dec. 23, 1969

3,485,970

PRESSURE OPERATED PAPER TAPE READER

Arnold Schonfeld, Levittown, and Marvin Jacoby, Fort Washington, Pa., assignors to Sperry Rand Corporation, New York, N.Y., a corporation of Delaware Continuation of application Ser. No. 421,842, Dec. 29, 1964. This application Dec. 27, 1968, Ser. No. 792,198
Int. Cl. H01h *43/08, 35/40*
U.S. Cl. 200—46 8 Claims

ABSTRACT OF THE DISCLOSURE

A pneumatic paper tape reader is disclosed which is a V-shaped body which tapers to a rounded end of small radius. The rounded end serves as the head past which tape is transported under tension. Parallel ducts communicate with a pressure chamber within the body. A pressure switch is connected to each of said ducts. When a hole in the tape passes the duct, the switch is activated, and when no hole is being sensed, the switch is deactivated by sensing the variations in pressure in the ducts.

This application is a continuation of application Ser. No. 421,842, filed Dec. 29, 1964, now abandoned.

This invention relates to a paper tape reader and more particularly to a pneumatic paper tape reader for sensing and indicating perforations in chadless paper tape as well as normal paper tape.

Normal paper tape is of the type wherein small holes are completely punched out. Chadless paper tape, on the other hand, is of the type in which a C section is lanced into the tape without actually removing any paper. The reading of either type of paper tape presents problems, but the most complicated problems in the reading of tape are associated with the chadless variety.

In general, two types of paper tape readers are in present use, i.e., mechanical and electronic.

One variety of mechanical paper tape reader consists generally of a plurality of spaced conductive fingers which are gently spring biased against the tape which passes thereunder. When a hole or holes pass under one or a combination of the conductive fingers an electrical contact is made through the hole to a conductive element over which the tape rides. By this action, switches are opened and closed in accordance with the spacing of holes on the tape. These switches may form part of an electrical circuit for reading out coded information in any well known manner. Needless to say, the mechanical reading tape results in wear both on the conducting elements as well as on the tape itself. In addition, such a system is prone to mechanical failure. Furthermore, in the reading of chadless tape another problem is presented. Since the C section of each perforation of the chadless tape is normally in a closed position relative to the tape, the perforation is not well defined so that difficulty may be encountered in the making of contact when a hole passes under one of the conductive fingers. To offset this difficulty, various means are used to cause the paper flap of the C section to open just before the tape passes through the read section. Such an operation is so beset with practical problems as to make the mechanical reading of chadless tape highly susceptible to inaccuracy due to mechanical failure.

The electronic variety of paper tape reader which uses a photo sensitive device to detect perforations in the tape, while effective to read normally punched paper tape, is all but useless in the reading of chadless paper tape. This is so because in the chadless type of paper tape reading the paper flap of the C section would normally block any source of light from the photo sensitive device. Thus, unless some means are utilized to remove or deflect the paper flap of the C section when the paper tape passes through the photoelectric sensing elements such a system would be hopelessly ineffective.

The present invention substantially eliminates all of the problems heretofore associated with the above-mentioned devices for the reading of chadless paper tape. The present invention contemplates a pneumatic paper tape reader which while it was designed specifically for use with chadless paper tape works equally well in the reading of normally punched paper tape. More specifically, the present invention contemplates a pneumatic paper tape reader which comprises a V-shaped body which tapers to a rounded end of a small radius with a chamber formed in the upper portion of the V-shaped body for receiving fluid. A chadless type tape is transported under a slight tension past the rounded end. A plurality of parallel spaced ducts communicate with the chamber and terminate in orifice in the rounded end. Each of these ducts communicate with a novel pressure switch which is responsive to the back pressure in respective ducts caused when the tape blocks respective orifices to close a pair of electrical contacts. When perforations in the tape coincide with respective orifices, the back pressure is reduced and the contacts in respective switches are opened.

Therefore, it is an object of the present invention to provide a pneumatic paper tape reader which not only overcomes the disadvantages associated with the mechanical and electronic paper tape readers as pointed out above but which also has a relatively much lower fabrication cost.

Another object of the present invention is to provide a chadless pneumatic paper tape reader which is unaffected by the amount that the chadless perforation is open.

A further object of the present invention is to provide a pneumatic paper tape reader for sensing and indicating the presence of holes either in regularly perforated tape or chadless perforated tape which is highly reliable in operation, which is capable of operation in extreme environmental conditions, and which is substantially free from RF radiation.

Yet another object of the present invention is to provide a pneumatic paper tape reader which substantially eliminates wear of the tape as well as the read element.

A still further object of the present invention is to provide a low cost, highly reliable pressure switch in combination with a tape reader, which is activated by extremely low pressures and is not affected by atmospheric condition.

Yet a further object of the present invention is to provide a pressure switch which is inexpensive to fabricate, highly reliable in operation, truly operative on static pressure and which has an extremely fast response time.

Other objects and advantages of the present invention will become more apparent with the reading of the specification in conjunction with the drawing wherein.

Figure 1:
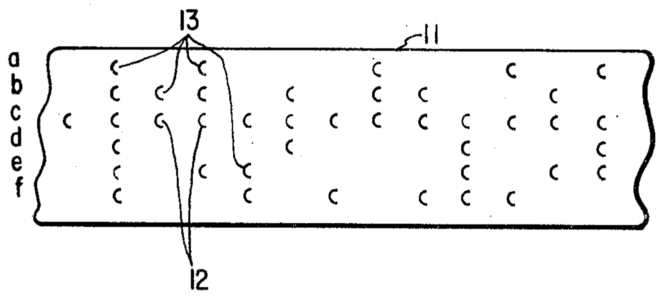
FIGURE 1 illustrates a section of chadless paper tape.

Referring now more particularly to FIGURE 1, there is shown a section of the chadless type of perforated paper tape 11. The chadless tape 11 has a plurality of C-shaped perforations lanced into it. A typically encoded tape, may for example, comprise rows *a* through *f* of chadless perforations. Row *c* may be a timing row wherein all the perforations 12 are equally spaced. While rows *a*, *b*, *d*, *e* and *f* contain information encoded thereon by means of the perforations 13.

Figure 2:
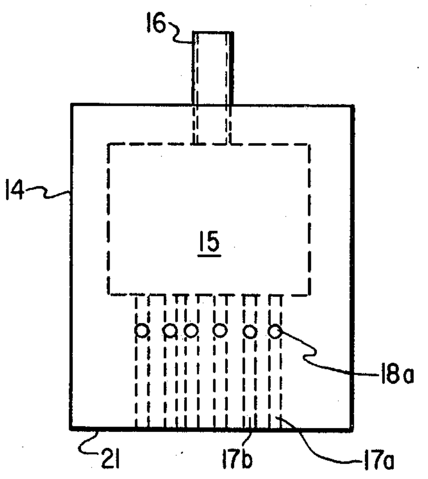
FIGURE 2 illustrates an elevational view of a preferred embodiment of the present invention.
Figure 3:
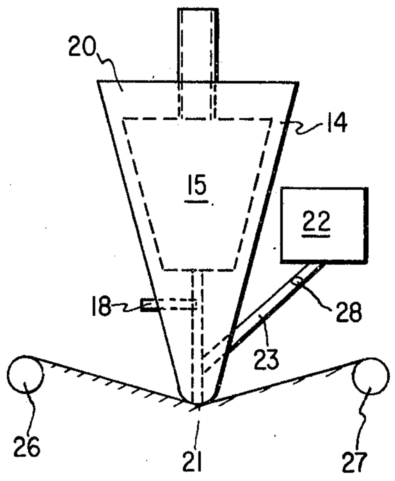
FIGURE 3 illustrates a side view of the paper tape reader of FIGURE 2.

FIGURES 2 and 3 illustrate a preferred embodiment of the pneumatic paper tape reader of the present invention. The tape reader comprises a V-shaped read head 14 which tapers from a relatively wide part 20 to a rounded end 21 having a relatively small radius. The read head 14 has formed therein a chamber or reservoir 15. An input duct 16 communicates with the chamber 15 for connecting a source of fluid (not shown) to the chamber 15.

A plurality of ducts 17*a* through 17*f* communicates with the chamber 15 and terminate in orifices 19*a* through 19*f* in the rounded end 21 of the read head 14. These ducts 17*a* through 17*f* are equal in number to the rows of perforations *a* through *f* on the tape and are spaced at such a distance from one another that the orifices 19*a* through 19*f* may align with the rows *a* through *f* of the tape.

As shown, in FIGURE 3, a pressure switch 22 is connected to the duct 17*a* at a point near orifice 19*a* by a conduit 23. Although, not shown, each of the other ducts 17*b* through 17*f* are similarly connected to pressure switches like pressure switch 22. Thus, there is a duct 17 and orifice 19 for reading each row *a* through *f* of the perforations. Since the pressure switch 22 is identical to and identically connected to the pressure switches associated with the ducts 17*b* through 17*f*, only the one is shown and described hereinbelow.

Each of the ducts 17*a* through 17*f* has a restriction disposed therewithin. These restrictions may be in the form of set screws 18*a* through 18*f* which extend into each of the ducts at a point near the chamber 15. The set screws are variable to thereby permit the resistance to fluid flow within each duct to be adjustable.

The tape 11 is disposed with respect to the rounded end 21 so that it may be contiguously driven under a slight tension past the rounded end 21. Reels 26 and 27 symbolically represent the supply and take-up reels and the means for transporting the tape 11 past the rounded end 21.

The read direction is from left to right and the tape is so disposed that each row *a* through *f* is aligned with an orifice 19*a* through 19*f*, respectively. Due to the fact that the tape is driven past the rounded end 21 under a slight tension and the fact that the rounded end 21 has a relatively sharp radius, the flap of each C section of a chadless perforation opens as the tape perforation coincides with an orifice 19.

Figure 4:
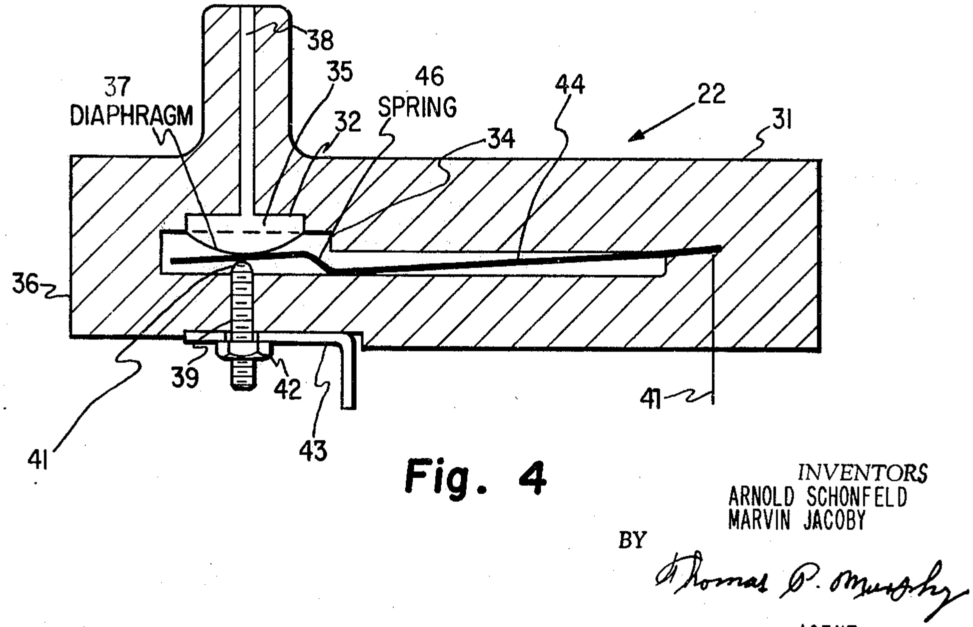
FIGURE 4 shows the detail of the pressure switch shown in FIGURE 3.

A preferred embodiment of pressure switch 22 is shown in FIGURE 4. The pressure switch 22 comprises a housing 31 composed of any convenient material such as plastic. The housing 31 encloses a chamber 32 which comprises a first cylindrical portion 35 and a second cylindrical portion 34 in concentric relationship to each other. The second portion 34 has a larger diameter than the diameter of the first portion 35 such that an annular interface 36 is formed in the line of juncture between the two portions.

A circular diaphragm 37 has its edge portion bonded to the interface 36 to effectively separate the first portion 35 from the second portion 34.

The diaphragm 37 consists of a thin, flexible plastic material. The diaphragm 37 is loosely flexible and, therefore, may provide a switching force without going into tension. A duct 38 which in practice is connected to the duct 23 shown on FIGURE 2, communicates with the portion of 35 of chamber 32.

A screw 39 made of electrically conductive material passes through the housing 31 and communicates with portion 34 of the chamber 32. The end portion of the screw 39 which communicates with the portion 34 is rounded and forms an electrical contact 41. The axis of the screw 39 coincides with the axis of the chamber 32. A bolt 42 rigidly secures a terminal 43 in electrical contact with the screw 39 to the body 31.

An elongated chamber 44 extends from the side of the portion 34. A thin cantilever spring 46 is disposed within the chamber 44 such that its free end is disposed between the diaphragm 37 and the contact 41. The other end of the spring 46 is fixed as by embedding in housing 31 at the extremity of chamber 44. An electrical terminal 47 which extends outside of the housing 31 is in contact with the spring 46 which is also electrically conductive.

The spring 46 is normally biased away from the contact 41. When there is static pressure in the duct 38 of a predetermined magnitude (which in this case may be less than one centimeter of water), the diaphragm 37 flexes and forces the spring 46 to make the contact 41. The center portion of the diaphragm 37 is loose and flexible and, therefore without going into tension the diaphragm bears against the end of the cantilever spring 46 forcing the spring 46 to make contact 41. Thus, the displacement of the spring 46 is a function only of the spring rate and the applied pressure. The displacement does not depend on the properties of stretched plastic diaphragms which are often erratic and changeable.

The gap distance between the contact 41 and the spring 46 is not critical and may be relatively large. An inert gas may be contained in the portion 34 to prevent contamination and oxidation due to arcing. Obviously pressure switch 22 may be constructed so that spring 46 is biased to make contact 41 and a predetermined pressure in the duct 38 would cause it to break contact with contact 41. This, of course, would involve a slight modification of pressure switch 22, e.g., diaphragm 37 and duct 38 would be positioned on the opposite side of spring 44 than that shown in FIGURE 4.

The volume of chamber 15 is large relative to the combined volume of duct 17*a* through 17*f*. Thus, the pressure change within the chamber 15 is negligible when orifices 19*a* through 19*f* are opened to the atmosphere. In this way the chamber 15 serves as a fluid capacitor so that there is very little change in the pressure therein whether there is a perforation in coincidence with one or all the orifices 19*a* through 19*f*.

The ducts 23 are connected to the ducts 17*a* through 17*f* at a point near the orifices 19*a* through 19*f* so that the pressure in the ducts 23 drops to substantially atmospheric pressure when the respective one or ones of the orifices 19*a* through 19*f* open to atmosphere. Each of the ducts 23 may have a small hole or vent 28 close to the pressure switch 22. Such an opening permits the pressure switch associated with its respective duct 23 to vent to atmosphere more rapidly when the pressure within the respective ducts 23 is at atmosphere. This improves system response.

The operation of the present invention will be discussed with reference to only one read position. That is, the one involving row *a* of the tape. Duct 17*a* and the transducer pressure switch 22 that is shown connected to the duct 17*a*. It should be obvious, however, that the other five read positions and their associated structure would each function in a manner identical to that one about to be discussed.

As aforesaid, a source of power fluid is connected to the chamber 15 via duct 16. This source of fluid need provide fluid at a pressure of only a few inches of water. The chadless tape 11 is transported past the rounded end 21 of the read head 14 such that the row *a* perforations moves in alignment past orifice 19*a*. When the tape 11 is being transported from supply reel 26 to the take-up reel 27, the orifice 19*a* of the duct 17*a* is blocked as long as no perforation passes over the orifice 19*a*. In the absence of such a perforation the pressure of the source which is in the chamber 15 causes pressure of a predetermined value in the duct 17*a*, the duct 23, and the pressure switch 22. This causes the spring 46 and contact 41 in the pressure switch 22 to remain closed for the reasons set forth above. When a perforation of the tape 11 passes under the orifice 19*a* the air in the duct 17*a* escapes through the orifice 19*a* and the perforation in the tape. The pressure within the duct 17*a* is momentarily reduced. This causes diaphragm 37 to relax and spring 46 breaks contact 41. After the perforated area of the tape passes the orifice 19*a*, the pressure within the duct 17*a*, 23 and the pressure switch rapidly increases thereby causing the contacts within the pressure switch 22 to make. This process repeats for each perforation in the tape which passes the orifice 19*a*. Likewise, the same process would go on for each of the other rows of the tape and its associated orifice 19*b* to 19*f*.

The orifice 19*a* is made small relative to the opening of the perforation in the tape. Therefore, the reader of the present invention is not sensitive to the degree of opening of the flap at the perforation area, nor is it particularly sensitive to the manner and direction in which it is opened. The restriction 18*a* in the duct 17*a* which may be in the form of a set screw, and therefore variable, prevents the fluid within the chamber 15 from filling the duct 17*a* as quickly as it can exhaust from the duct 17*a* through the orifice 19*a* when a tape perforation is under the orifice 19*a*. This, of course, assures operation of the pressure of switch.

In any event opening of the flaps to some degree is assured by the particular shape of the rounded end 21 which, as aforesaid, has a small radius. Therefore, as the chadless tape is driven past the rounded end 21 under a slight tension, th flaps of the C sections of the perforations are opened somewhat as they pass their respective orifices. Furthermore, since the coincidence of the perforations with an orifice in the rounded end 21 causes air to escape from the associated duct 17 out through the perforation in the tape, the opening of the flap is further assured by the action of the air passing it. Thus, reliable operation of the present invention is virtually assured.

What is claimed is:

1. In a pneumatic tape reader, a chadless tape, a V-shaped read head tapering to a rounded end of small radius, a chamber formed in said read head, a source of fluid under pressure, an input duct connected between said source of fluid and said chamber, at least one output duct communicating with said chamber and terminating at an orifice in said rounded end for forcing fluid out of said orifice when the latter is unblocked, means transporting the tape to be read contiguously past said rounded end such that the V-shaped read head causes the flap of the chadless perforation to open and causing the pressure in said output duct to be rapidly reduced when a hole in the tape passes said orifice.

2. In a pneumatic tape reader, a chadless tape, a V-shaped body tapering to a rounded end of small radius, a chamber formed in said body, a source of fluid under pressure, an input duct connected between said source of fluid and said chamber, at least one output duct communicating with said chamber and terminating at an orifice in said rounded end for forcing fluid out of said orifice when the latter is unblocked, means transporting the tape to be read contiguously past said rounded end under tension such that the V-shaped read head causes the flap of the chadless perforation to open, transducer means communicating with said output duct for converting pressure changes in said output duct caused by a hole in the tape passing over said orifice to an electrical signal.

3. A pneumatic paper tape reader comprising in combination: a chadless tape, a read head having a chamber formed therein for reading said tape, means supplying said chamber with fluid, at least one duct communicating with said chamber and terminating in an orifice external to said read head, pressure switch means having a pair of normally open contacts, conduit means connecting said duct to said pressure switch whereby the pressure in said duct closes said contacts when said orifice is blocked, means connected to said conduit to speed the switch response when said switch returns to the open position.

4. A pneumatic paper tape reader according to claim 2 wherein said duct includes means for varying its resistance to fluid flow.

5. A pneumatic paper tape reader comprising in combination: a chadless tape means having perforations, a V-shaped read head tapering to a rounded end, a chamber formed in said read head, means supplying said chamber with fluid, at least one duct communicating with said chamber and terminating at an orifice in said rounded end, means transporting the tape to be read contingously past said rounded end under tension such that the V-shaped head causes the flap of the chadless perforation to open, pressure switch means having a pair of normally open contacts, conduit means connecting said duct to said pressure switch whereby the pressure in said duct caused by the tape blocking said orifice closes said contacts, means connected to said conduit to speed the switch response when said switch returns to the open position.

6. A pneumatic paper tape reader according to claim 5 wherein said duct includes means for varying its resistance to fluid flow.

7. A pneumatic paper tape reader, comprising in combination: a chadless tape means having perforations, a V-shaped read head tapering to a rounded end, a chamber formed in said read head, means supplying said chamber with fluid, at least one duct communicating with said chamber and terminating at an orifice in said rounded end, means transporting the tape to be read contiguously past rounded end under tension such that the V-shaped read head causes the flaps of the chadless perforation to open, a switch housing having a chamber formed therein, a flexible diaphragm fixed within said chamber of said switch housing and dividing said chamber of said switch housing into first and second portions, conduit means connecting said duct to said first portion, vent means connected to said conduit means, an electrical contact rigidly disposed in said second portion opposite said diaphragm, a cantilever spring disposed in said second portion between said contact and said diaphragm normally biased away from said contact responsive to a pressure rise in said conduit means caused by the absence of a hole in the tape under said orifice to make said contact, said vent means speeding the response of said reader.

8. In a pneumatic paper tape reader according to claim 7 wherein said duct includes means for varying its resistance to fluid flow.

References Cited

UNITED STATES PATENTS

| | | | |
|---|---|---|---|
| 412,657 | 10/1899 | Pain. | |
| 1,078,133 | 11/1913 | Dorricott. | |
| 1,124,814 | 1/1915 | Scharold. | |
| 1,745,394 | 2/1930 | Zouckermann. | |
| 2,149,068 | 2/1939 | Paul et al. | |
| 2,510,552 | 6/1950 | Carroll et al. | 234—89 |
| 2,860,200 | 11/1958 | Leitz et al. | 200—46 |
| 3,300,703 | 1/1967 | Gold et al. | 200—83 |
| 3,335,242 | 8/1967 | Johnson | 200—83 |

ROBERT K. SCHAEFER, Primary Examiner

D. SMITH, Jr., Assistant Examiner

U.S. Cl. X.R.

200—83; 235—61.11